United States Patent

Ahn (10) Patent No.: US 11,347,805 B2
(45) Date of Patent: May 31, 2022

(54) ELECTRONIC APPARATUS, METHOD FOR CONTROLLING THE SAME, AND NON-TRANSITORY COMPUTER READABLE RECORDING MEDIUM

(71) Applicant: Samsung Electronics Co., Ltd., Suwon-si (KR)

(72) Inventor: Hyoung-joo Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 16/464,907

(22) PCT Filed: Mar. 5, 2018

(86) PCT No.: PCT/KR2018/002593
§ 371 (c)(1),
(2) Date: May 29, 2019

(87) PCT Pub. No.: WO2018/164435
PCT Pub. Date: Sep. 13, 2018

(65) Prior Publication Data
US 2020/0097507 A1    Mar. 26, 2020

(30) Foreign Application Priority Data

Mar. 8, 2017  (KR) .................. 10-2017-0029490
Nov. 3, 2017  (KR) .................. 10-2017-0145925

(51) Int. Cl.
*G06F 3/0487* (2013.01)
*G06F 16/903* (2019.01)
(Continued)

(52) U.S. Cl.
CPC ...... *G06F 16/90335* (2019.01); *G06F 3/0487* (2013.01); *G06F 16/95* (2019.01); *G06N 20/00* (2019.01)

(58) Field of Classification Search
CPC .. G06F 16/90335; G06F 16/95; G06F 3/0487; G06N 20/00
See application file for complete search history.

(56) References Cited

U.S. PATENT DOCUMENTS 7,363,294 B2   4/2008  Billsus et al.
9,100,723 B2   8/2015  Nguyen et al.
(Continued)

FOREIGN PATENT DOCUMENTS

JP   2005-182804 A     7/2005
KR   10-2012-0026781 A  3/2012
(Continued)

OTHER PUBLICATIONS

Abayomi M. Otebolaku et al., Supporting Context-Aware Cloud-based Media Recommendations for Smartphone, Apr. 1, 2014, IEEE Computer Society, pp. 109-116 (Year: 2014).*

(Continued)

*Primary Examiner* — Tam T Tran
(74) *Attorney, Agent, or Firm* — Jefferson IP Law, LLP (57) ABSTRACT

An electronic apparatus is provided. The electronic apparatus includes an input interface configured to receive a user command, a memory, a display configured to display a content, and a processor configured, in response to a predetermined command with respect to the content being received through the input interface, to acquire context information of the content by analyzing the content, to store the context information together with the information relating to the content in the memory, and in response to a context corresponding to the context information being detected, to control the display to provide a content corresponding to the detected context. At least some of a method for controlling the electronic apparatus may use a rules-based model or an artificial intelligence model which is trained according to at least one of a machine learning, a (Continued)

neural network, and a deep learning algorithm. For example, the artificial intelligence model may provide context information, which is a result of determination using a content as an input value, to the electronic apparatus.

11 Claims, 7 Drawing Sheets

(51) Int. Cl.
    *G06F 16/95*     (2019.01)
    *G06N 20/00*     (2019.01)

(56) References Cited

U.S. PATENT DOCUMENTS

| | | | |
|---|---|---|---|
| 9,179,250 B2 | 11/2015 | Eustice et al. | |
| 9,336,237 B2 | 5/2016 | Meier et al. | |
| 2001/0039546 A1 | 11/2001 | Moore et al. | |
| 2005/0137996 A1 | 6/2005 | Billsus et al. | |
| 2007/0214488 A1* | 9/2007 | Nguyen | G06F 16/78 725/134 |
| 2012/0010995 A1* | 1/2012 | Skirpa | G06F 16/95 705/14.49 |
| 2012/0095997 A1* | 4/2012 | Nice | G06F 16/2457 707/728 |
| 2014/0046590 A1 | 2/2014 | Needham et al. | |
| 2014/0282375 A1 | 9/2014 | Gulwani et al. | |
| 2014/0344687 A1* | 11/2014 | Durham | G06F 3/04883 715/716 |
| 2015/0134597 A1 | 5/2015 | Badea et al. | |
| 2015/0154956 A1 | 6/2015 | Brown | |
| 2015/0227580 A1 | 8/2015 | Spranger et al. | |
| 2015/0331847 A1 | 11/2015 | Jung et al. | |
| 2016/0004732 A1 | 1/2016 | Hsu et al. | |
| 2016/0155096 A1 | 6/2016 | Choi | |
| 2016/0170991 A1 | 6/2016 | Birchall et al. | |

FOREIGN PATENT DOCUMENTS

| | | |
|---|---|---|
| KR | 10-2014-0132022 A | 11/2014 |
| KR | 10-2015-0049441 A | 5/2015 |
| WO | 02/17130 A2 | 2/2002 |
| WO | 2015/182893 A1 | 12/2015 |

OTHER PUBLICATIONS

Yuta Miyazawa et al., Context-Aware Recommendation System using Content Based Image Retrieval with Dynamic Context Considered, Dec. 1, 2013, IEEE Computer Society, pp. 779-783 (Year: 2013).*
Salakhutdinov, Ruslan et al., "Replicated Softmax: an Undirected Topic Model", Brain and Cognitive Sciences and CSAIL, Massachusetts Institute of Technology, Dec. 7, 2009.
Rajaraman K. et al., "Topic Detection, Tracking and Trend Analysis Using Self-organizing Neural Networks", Kent Ridge Digial Labs, Singapore, Singapore, Apr. 11, 2001.
Hu Diane J., "Latent Dirichlet Allocation for Text, Images, and Music", Deparment of Computer Science, University of California, San Diego, 2009.
Gasser, Michael et al., "Pattern Learning in Infants and Neural Networks", Cognitive Science Program, Indiana University, Bloomington, Indiana, 2002.
Struyf, Jan et al., "Relational Learning", Dept. of Computer Science, Katholieke Universiteit Leuven, Leuven, Belgium, Jan. 2017.
European Search Report dated Dec. 3, 2019, issued in European Patent Application No. 18764090.9.
European Office Action dated May 17, 2021, issued in European Application No. 18764090.9.
Korean Office Action dated Nov. 30, 2021, issued in Korean Application No. 10-2017-0145925.

* cited by examiner

ELECTRONIC APPARATUS, METHOD FOR CONTROLLING THE SAME, AND NON-TRANSITORY COMPUTER READABLE RECORDING MEDIUM

TECHNICAL FIELD

Apparatuses and methods consistent with example embodiments relate to an electronic apparatus, a method for controlling the same, and a non-transitory computer readable recording medium, and more particularly, to an electronic apparatus for providing a content corresponding to detected context from among pre-stored contents, a method for controlling the same, and a non-transitory computer readable recording medium.

In addition, the present disclosure relates to an artificial intelligence (AI) system for mimicking functions such as cognition, decision of human brain and the like, using a machine learning algorithm, and an application thereof.

BACKGROUND ART

Recently, the artificial intelligence (AI) system to implement intelligence of a human level is used in various fields.

The AI system is a computer system which implements intelligence of a human level, and is a system in which a machine learns and determines by itself to get smart, unlike previous rules-based smart system. As the AI system is used more and more, a recognition rate is improved and thus, a taste of a user is understood more accurately. Accordingly, the previous rules-based smart system is gradually replaced with a deep-learning AI system.

The AI technology includes a machine learning (deep learning) and element technologies using the machine learning.

The machine learning is an algorithm technology which classifies and learns features of input data by itself. The element technology is a technique that uses a machine learning algorithm such as deep learning and the like, which includes technical fields including linguistic understanding, visual understanding, inference/prediction, knowledge expression, motion control and the like.

Various fields to which the AI technology is applied are as follows. The linguistic understanding is a technique of recognizing a language and character of human and applying and processing the same, which includes natural language processing, machine translation, conversation system, question and answer, voice recognition and synthesis and the like. The visual understanding is a technique of recognizing and processing an object just like a human sight, which includes object recognition, object tracking, image search, human recognition, scene understanding, space understanding, image improvement and the like. The inference prediction is a technique of determining information and make a logical inference and prediction, which includes knowledge/probability-based inference, optimization prediction, preference-based plan, recommendation and the like. The knowledge expression is a technique of performing automation processing with respect to experience information of human with knowledge data, which includes knowledge construction (data generation/classification), knowledge management (data usage) and the like. The motion control is a technique of controlling an autonomous driving of a vehicle and movement of a robot, which includes a motion control (navigation, collision, drive), manipulation control (behavioral control) and the like.

Meanwhile, the recent advancement of communication technology has enabled users to access a number of contents by using an electronic apparatus. In particular, the user may store, clip or share a content to use some of the contents again later.

However, even if the content is stored, as time goes by, the user forgets the stored content and the stored content becomes less useful. In particular, when the content is needed, the user does not remember the content, which is inconvenient.

DISCLOSURE OF INVENTION

Solution to Problem

One or more example embodiments provide an electronic apparatus which stores context information of a content along with information relating to the content through an AI technology and in response to a context corresponding to the context information being detected, provides a content corresponding to the detected context, a method for controlling the same, and a non-transitory computer readable recording medium.

According to an aspect of an example embodiment, there is provided a method for controlling an electronic apparatus, the method comprising: in response to a predetermined command with respect to a content being received, acquiring context information of the content by analyzing the content; storing the context information together with the information relating to the content; and in response to context corresponding to the context information being detected, providing a content corresponding to the detected context.

According to an aspect of an example embodiment, there is provided an electronic apparatus, comprising: an input interface configured to receive a user command; a memory; a display configured to display a content; and a processor configured, in response to a predetermined command with respect to the content being received through the input interface, to acquire context information of the content by analyzing the content, to store the context information together with the information relating to the content in the memory, and in response to a context corresponding to the context information being detected, to control the display to provide a content corresponding to the detected context.

According to an aspect of an example embodiment, there is provided a non-transitory computer readable recording medium of which stored a program for executing a method for controlling an electronic apparatus, wherein the method comprises: in response to a predetermined command with respect to a content being received, acquiring context information of the content by analyzing the content; storing the context information together with the information relating to the content; and in response to context corresponding to the context information being detected, providing a content corresponding to the detected context.

Advantageous Effects of Invention

According to the various example embodiments described above, the electronic apparatus provides a pre-stored content corresponding to the detected context, so that the user may identify the content clipped or stored by him or her as necessary without additional operation.

MODE FOR THE INVENTION

Hereinafter, preferred embodiments of the present disclosure will be described in detail with reference to the accompanying drawings. For reference, when it is determined that the detailed description of the known function or configuration may obscure the gist of the embodiments in describing them, the detailed description thereof will be omitted. Among the terms used herein, those that are defined in the dictionaries may be interpreted based on the same or similar definitions that can be understood in the associated technical context, and unless specifically defined otherwise, these are not interpreted as ideal or unnecessarily formal ways. Therefore, the terms used in the exemplary embodiments should be defined based on the meaning thereof and the descriptions of the present disclosure, rather than based on their names only.

The term such as "first" and "second" used in various example embodiments may use corresponding components regardless of importance or order and are used to distinguish a component from another without limiting the components. In embodiments of the present disclosure, relational terms such as first and second, and the like, may be used to distinguish one entity from another entity, without necessarily implying any actual relationship or order between such entities. For example, a first element may be named a second element without departing from the scope of right of various example embodiments, and similarly, a second element may be named a first element. The term of and/or includes combination or one of a plurality of related items recited.

The terms used in the following description are provided to explain example embodiments and are not intended to limit the scope. It is to be understood that the singular forms "a," "an," and "the" include plural referents unless the context clearly dictates otherwise. The terms, "include", "have", etc. of the description are used to indicate that there are features, numbers, steps, operations, elements, parts or combination thereof, and they should not exclude the possibilities of combination or addition of one or more features, numbers, steps, operations, elements, parts or combination thereof.

According to an exemplary embodiment, 'module' or 'unit' may perform at least one function or operation, and may be implemented to be hardware, software or combination of hardware and software. Further, a plurality of 'modules' or a plurality of 'units' are integrated into at least one module except for the 'module' or 'unit' which needs to be implemented by specific hardware and thus may be implemented by at least one processor.

Figure 1:
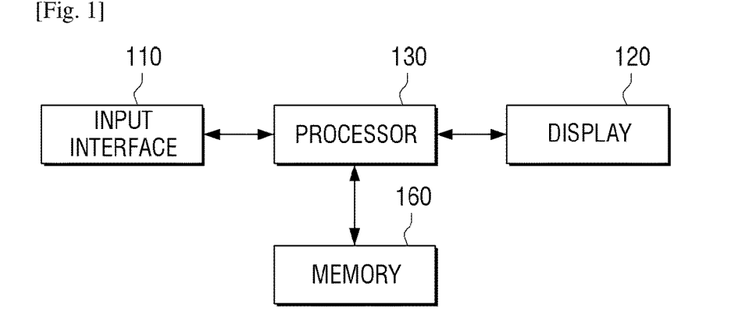
FIG. 1 is a block diagram briefly illustrating a configuration of an electronic apparatus, according to an exemplary embodiment.
Figure 8:
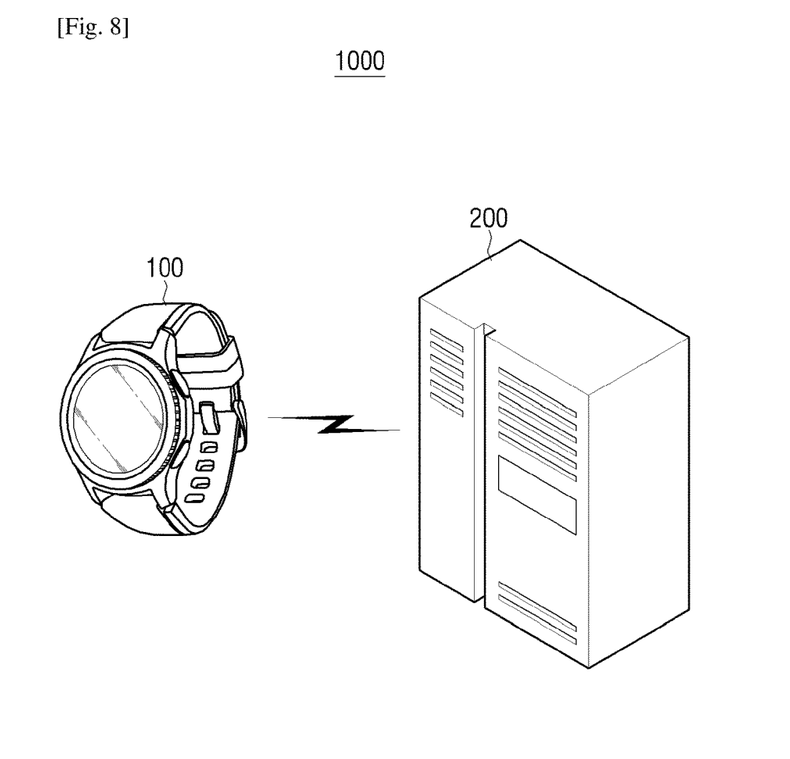
FIG. 8 is a diagram illustrating a system providing a context recognition service, according to another example embodiment.

Below, an exemplary embodiment will be described in detail with reference to the attached drawings. FIG. 1 is a block diagram illustrating a brief configuration of an electronic apparatus 100, according to an exemplary embodiment. The electronic apparatus 100 may recognize a context alone and provide a context recognition service which provides a pre-stored content as illustrated in FIG. 1. When the electronic apparatus 100 provides the context recognition service alone, the electronic apparatus 100 may be implemented as various electronic apparatuses, such as a smartphone, a tablet PC, a laptop PC, a desktop PC, a wearable device such as a smart watch, an electronic frame, a humanoid robot, an audio device, a smart TV, and the like. As another example, the electronic apparatus 100 may be interwork with a server 200 and provide a context recognition service to the user as illustrated in FIG. 8.

As illustrated in FIG. 1, the electronic apparatus 100 includes an input interface 110, a display 120, a memory 160, and a processor 130.

The input interface 110 receives a user command. In particular, the input interface 110 may receive a predetermined command (e.g., a clipping command, a storage command, a share command and the like) with respect to a content currently provided (e.g., a webpage content, a video content and the like). In this regard, the input interface 110 may be implemented as a touch panel.

The display 120 provides a content. In addition, when a context corresponding to pre-stored context information is detected, the display 120 may provide a message for informing a content corresponding to the detected stored context.

The memory 160 may store various data and programs to control the display apparatus 100. In particular, the memory 160 may store information relating to a content and context information matched with the information relating to the content. In addition, the memory 160 may store a pre-trained data determination model to acquire a keyword.

The processor 130 may be configured to control an overall operation of the electronic apparatus 100 by using various programs and data stored in the memory 160. In particular, in a case in which a predetermined command with respect to a content is input through the input interface 110, the processor 130 may acquire context information of the content by analyzing a stored content, and may store the context information along with information relating to the content in a memory 160. In addition, when a context corresponding to the stored context information is detected, the processor 130 may control the display 120 to provide a content corresponding to the detected context.

For example, the input interface 110 may receive a predetermined command with respect to a content currently provided. For example, the input interface 110 may receive a command to share, store and clip a web page currently provided.

In addition, the processor 130 may acquire a keyword regarding a content to which the predetermined command is input by using the acquired data determination model, and may acquire context information based on the acquired keyword. In this regard, the processor 130 may acquire context information corresponding to the keyword by using a pre-trained data determination model, but this is only an example, and the processor 130 may acquire context information corresponding to the keyword by using a pre-stored matching table.

In addition, the processor 130 may tag the acquired context information with information relating to the content (e.g., address information of the content, information relating to storage location of the content and the like) in the memory 160.

After the information relating to the content is tagged with the context information, the processor 130 may detect a context corresponding to the stored context information.

Specifically, the processor 130 may detect a context corresponding to the stored context information from a sensing value acquired from a sensor included in the electronic apparatus 100. For example, the processor 130 may acquire location information of a user from a global positioning system (GPS) sensor included in the electronic apparatus 100, and may detect a context of the user based on the location information of the user. Alternatively, the processor 130 may acquire information relating to a context from an external device connected to the electronic apparatus 100, and may detect a context corresponding to the stored context information based on the acquired information. For example, the processor 130 may acquire information relating to a store from an external device provided in the store, and may detect a user context based on the acquired information. Alternatively, the processor 130 may detect a context corresponding to the context information based on schedule information stored in the electronic apparatus 100.

In addition, the processor 130 may identify a current context based on information relating to the previously-detected context stored in the memory 160. For example, the processor 130 may detect a user context by estimating a current destination of the user based on a previously-detected moving path of the user.

When a context corresponding to the stored context information is detected, the processor 130 may control the display 120 to provide a message for informing context detection. In this regard, the message may include at least one from among information relating to a currently-detected context, information relating to a content corresponding to the detected context, and an icon inquiring whether a content is to be provided.

When a user command (e.g., a user command to identify a content, and the like) is input through a message, the processor 130 may control the display 120 to provide a content corresponding to the detected context.

Figure 2:
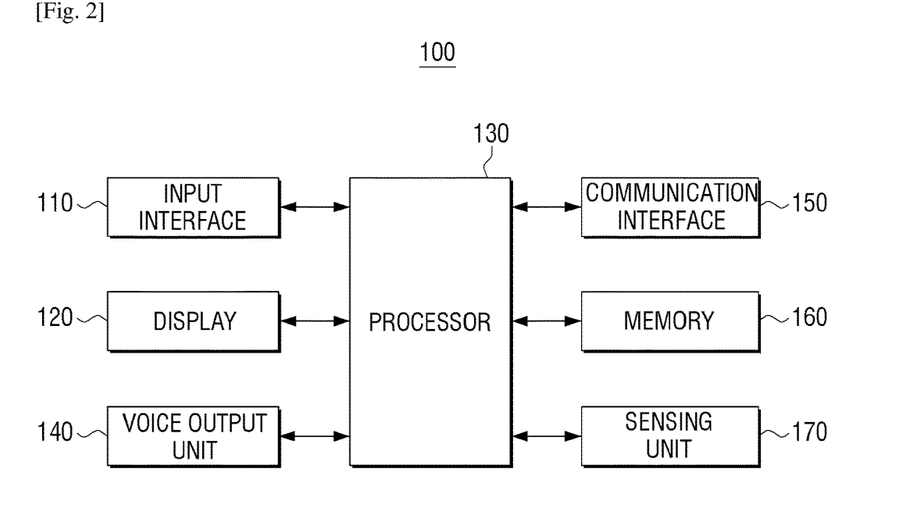
FIG. 2 is a block diagram of a detailed configuration of an electronic apparatus, according to an example embodiment.

FIG. 2 is a block diagram illustrating a detailed configuration of the electronic apparatus 100, according to an example embodiment. Referring to FIG. 2, the electronic apparatus 100 may include an input interface 110, a display 120, a processor 130, a voice output interface 140, a communication interface 150, a memory 160, and a sensing unit 170. In addition to the elements illustrated in the example embodiment of FIG. 2, the electronic apparatus 100 may include various elements such as an image receiver (not illustrated), an image processor (not illustrated), a power supply (not illustrated), and the like. In addition, it is possible that the electronic apparatus 100 does not include all features illustrated in FIG. 2. For example, when the electronic apparatus 100 is implemented as a server, it is possible that the display 120, the voice output interface 140, the sensing unit 170 are not included.

The input interface 110 may receive a user command. In particular, the input interface 110 may receive a predetermined command (e.g., a clipping command, a storage command, a share command and the like) with respect to a content currently provided.

In addition, the input interface 110 may be implemented as a touch panel and receive a user touch command. In addition, when the input interface 110 is implemented as a touch panel, the touch panel and the display 120 may be combined with each other and implemented in a form of a touch screen having a mutual layer structure. The touch screen may detect a position, area and pressure of the touch input and the like.

In addition, the input interface 110 may receive a user command in a variety of forms. For example, the input interface 110 may be implemented as a mouse, a keyboard, a voice input device, a motion input device and the like and receive a user command.

The display 120 may display various guides, image contents, information, UIs and the like provided by the electronic apparatus 100. The display 120 may be realized as a Liquid Crystal Display (LCD), an Organic Light Emitting Display (OLED) or a Plasma Display Panel (PDP), etc., and display various screens which can be provided through the electronic apparatus 100.

The display 120 may provide various forms of contents. For example, the display 120 may provide various contents such as a web page content, a video content and the like. In addition, the display 120 may provide a message for informing a content corresponding to a context.

The voice output interface 140 may output a voice. For example, the voice output interface 140 may output not only various audio data but also notification sounds or voice messages. The electronic apparatus 100 according to an example embodiment may include the voice output interface 140 as one of output interfaces to provide an interactive context detection function. By outputting a natural language-processed voice message through the voice output interface 140, the electronic apparatus 100 may provide the user with a user experience that seems to talk to the electronic apparatus 100. The voice output interface 140 may be built in the electronic apparatus 100, or may be implemented in a form of an output port such as a jack and the like.

The communication interface 150 may communicate with an external apparatus. For example, the external apparatus may be implemented as another electronic apparatus, a server, a cloud storage, a network and the like. The communication interface 150 may receive various data for identifying a context from an external apparatus. The communication interface 150 may receive a data determination model and the like for acquiring a keyword and context information from an external apparatus.

To this end, the communication interface 150 may include a variety of communication modules such as a near-field wireless communication module (not illustrated) and a wireless communication module (not illustrated). Herein, the near-field wireless communication module refers to the module which communicates with an external device located nearly, according to a near-field wireless communication method such as Bluetooth, Zigbee and the like. In addition, the wireless communication module refers to the module which is connected to an external network according to a wireless communication protocol such as WiFi, WiFi direct, IEEE and the like, and performs a communication. In addition to the above, the wireless communication module may further include a mobile communication module which accesses a mobile communication network according to a variety of mobile communication standards such as 3rd generation (3G), 3rd Generation Partnership Project (3GPP), Long Term Evolution (LTE) and LTE Advanced (LTE-A) and which performs a communication.

The memory 160 may store various modules, software and data for controlling the display apparatus 100. For example, the memory 160 may store a data determination model for acquiring a keyword of a content or a data determination model for acquiring context information that matches with the keyword. The memory 160 may store a model for Natural Language Generation (NLG).

The memory 160 may store programs and data for configuring various screens to be displayed on the display 120. In addition, the memory 240 may store programs, applications and data for performing a specific service.

The memory 160 is a storage medium which stores various programs to operate the electronic apparatus 100, and may be implemented as a flash memory, a hard disk drive (HDD), a Solid State Drive (SSD), and the like. For example, the memory 160 may include a read only memory (ROM) which stores programs to operate the electronic apparatus 100 and a random access memory (RAM) which temporarily stores data according to operation execution of the electronic apparatus 100.

Figure 3:
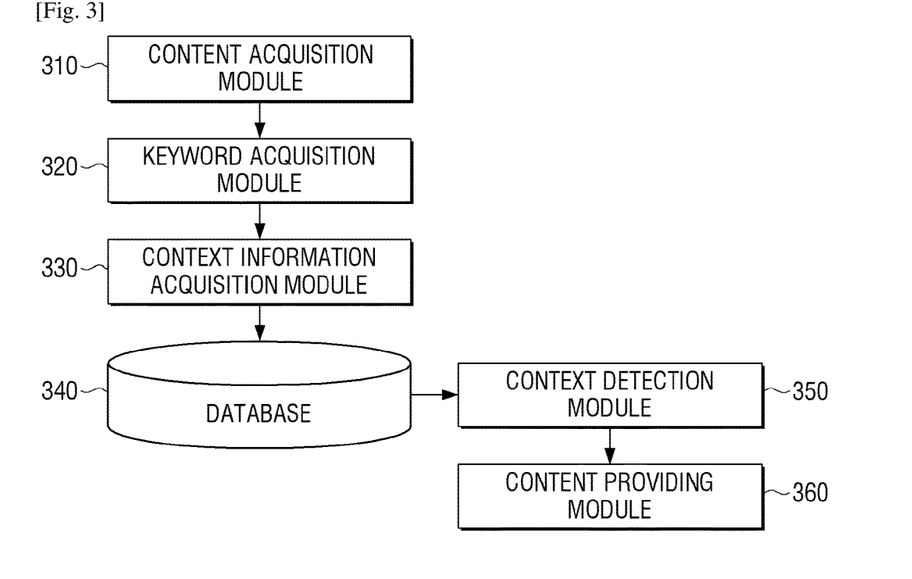
FIG. 3 is a block diagram illustrating a configuration for providing a context recognition service, according to an example embodiment.

In addition, the memory 160 may store a plurality of modules for acquiring context information corresponding to a content and storing the acquired context information, detecting a context corresponding to the stored context information and providing the context. For example, the memory 160 may, as illustrated in FIG. 3, include a context acquisition module 310, a keyword acquisition module 320, a context information acquisition module 330, a database 340, a context detection module 350, and a context providing module 360.

The content acquisition module 310 may acquire a content received from a server and an external apparatus or a pre-stored content. In this regard, the acquired content may be a web page content, but this is only an example, and it may be various forms of contents such as a video content, a photo content, an audio content and the like.

The keyword acquisition module 320 may acquire a keyword regarding a content. In this regard, the keyword acquisition module 320 may analyze a content by using a pre-trained data determination model and then, acquire a keyword of the content. In addition, the keyword acquisition module 320 may acquire a keyword through semantic analysis of a text included in the content.

The context information acquisition module 330 may acquire context information corresponding to the detected keyword. In this regard, the context information acquisition module 330 may acquire context information corresponding to the detected keyword by using a pre-stored keyword-context information matching table, and may acquire context information corresponding to the detected keyword by using a pre-trained data determination model.

Meanwhile, a data determination model used by the keyword acquisition module 320 and the context information acquisition module 330 will be described in greater detail with reference to FIGS. 9-10b. In addition, according to an example embodiment, context information corresponding to a content may be acquired using one data determination model.

The database 340 may store information relating to a content and information relating to a context matched with the information relating to the content. For example, the database 340 may store address information of the content tagged with context information.

The context detection module 350 may detect a context of a user by using a sensing data acquired from the sensing unit 170, a data received from an external apparatus, or a pre-stored schedule data. In addition, the context detection module 350 may identify whether the detected context matches with pre-stored context information and detect a context corresponding to the pre-stored context information.

The content providing module 360 may provide a content corresponding to the detected context. For example, the content providing module 360 may first provide a message for informing detection of a context before a content is provided, and in response to a user command being input through a message, provide the content.

Referring back to FIG. 2, the sensing unit 170 may acquire sensing data for detecting a context through various sensors. In particular, the sensing unit 170 may acquire data relating to a position of a user from a GPS sensor, and acquire data relating to a motion of the user from a motion sensor (e.g., an acceleration sensor, a gyro sensor and the like).

In addition, the sensing unit 170 may include various sensors (e.g., a temperature sensor, an illumination sensor, a humidity sensor and the like) for detecting surrounding circumstances of the electronic apparatus 100.

The processor 130 may control the above-mentioned elements of the electronic apparatus 100. For example, the processor 130 may acquire context information corresponding to a content by using a plurality of software modules included in the memory 160, match the acquired content information and the acquired context information and store the same, detect a context corresponding to the stored context information, and provide a content corresponding to the detected context.

In addition, the processor 130 may be implemented as a single CPU and perform a keyword acquiring operation, a content information acquiring operation, a content detecting operation, and the like, or may be implemented as a plurality of processors and an Integrated Processor (IP) performing a specific function. The processor 130 may acquire a keyword based on deep learning such as a deep neural network (DNN).

In addition, the processor 130 may use a big data and history data for each user to acquire a keyword and context information. Through this process, the processor 130 may not only use a data determination model for acquiring a keyword and context information trained through big data but also personalize the data determination model.

One or more example embodiments will be described in greater detail with reference to FIGS. 4a, 4b, 5a, 5b, 6a and 6b.

Figure 4A:
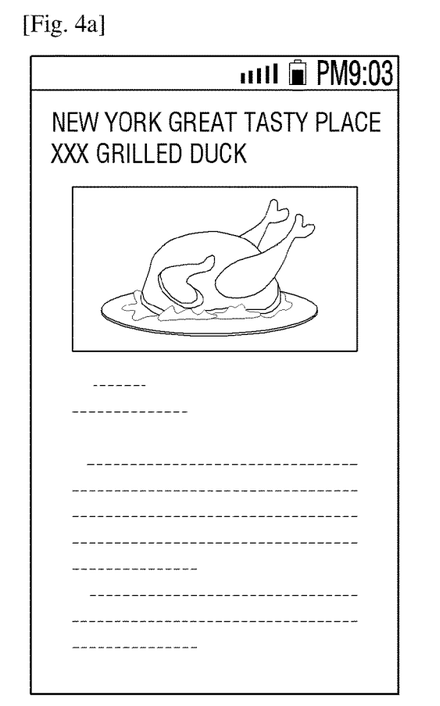
FIGS. 4a, 4b, 5a, 5b, 6a and 6b are diagrams illustrating an example embodiment of recognizing a context and providing a content corresponding to the context, according to various example embodiments.

According to an example embodiment, the content acquisition module 310 may acquire a content and provide the acquired content through a display 120. For example, the content acquisition module 310 may, as illustrated in FIG. 4a, acquire a web page content "New York great tasty place XXX Grilled Duck" and provide the acquired web page content through the display 120.

While the content is provided, when a predetermined user command (e.g., a clipping command, a storage command, a share command and the like) is detected, the keyword acquisition module 320 may acquire a keyword regarding the acquired content. For example, the keyword acquisition module 320 may acquire a keyword regarding the acquired content through a pre-trained data determination model. In this regard, the data determination model may be an acquisition model for acquiring a keyword from a text and image included in a document. Alternatively, the keyword acquisition module 320 may acquire a keyword regarding the content through semantic analysis of the text included in the content. For example, the keyword acquisition module 320 may acquire keywords such as "New York", "Grilled Duck" "great restaurant" "lunch" and the like, from the web page content "New York great tasty place XXX Grilled Duck" through the pre-trained data determination model or through semantic analysis.

The context information acquisition module 330 may acquire context information corresponding to the acquired keyword. In this regard, the context information acquisition module 330 may acquire context information corresponding to the acquired keyword through a pre-trained data determination model or a pre-stored keyword-context information matching table.

For example, the context information acquisition module 330 may acquire "New York visit", "New York lunch" "grilled duck meal", "tasty place search" and the like by using context information corresponding to keywords such as "New York", "grilled duck", "tasty place" "lunch" and the like.

In addition, the database 340 may store context information acquired by the context information acquisition module 330 and information relating to the content that is matched with the context information. For example, the database 340 may store information relating to the content (e.g., address information) and store context information matched with the information relating to the content as shown below.

TABLE 1

| Information relating to content | Context information |
|---|---|
| http//:www.matzip.com/origogi | "New York visit", "New York lunch", "grilled duck meal" "tasty place search" |

After the information relating to the content and the context information are matched and stored in the database 340, the context detection module 350 may detect a context corresponding to the stored context information.

In this regard, the context detection module 350 may detect a context from a sensing data acquired from the sensing unit 170. For example, when it is determined from the sensing data detected from the GPS sensor that the location information of the electronic apparatus 100 is "New York", the context detection module 350 may detect that a current context is "New York visit?.

In addition, the context detection module 350 may detect a context from the data acquired from an external apparatus. For example, when it is determined that the location information of the electronic apparatus 100 is "New York" by using the data acquired from an AP installed at a subway station, the context detection module 350 may detect that a current context is "New York visit?.

In addition, the context detection module 350 may detect a context from schedule information input by a user. For example, when schedule information of "lunch appointment with A in New York on Jan. XX, 2017" is input, the context detection module 350 may detect a context "New York lunch?.

As another example, in a case in which a user inputs and searches for a text "tasty place" in a search window of a web page, the context detection module 350 may detect a context "tasty place search?.

The context providing module 360 may control the display 120 to provide a context corresponding to the detected context. For example, in a case in which a context such as "New York visit", "New York lunch" and "tasty place search" is detected by the context detection module 350, the context providing module 360 may control the display 120 to provide a web page content "New York great tasty place XXX Grilled Duck" corresponding to the detected context.

Figure 4B:
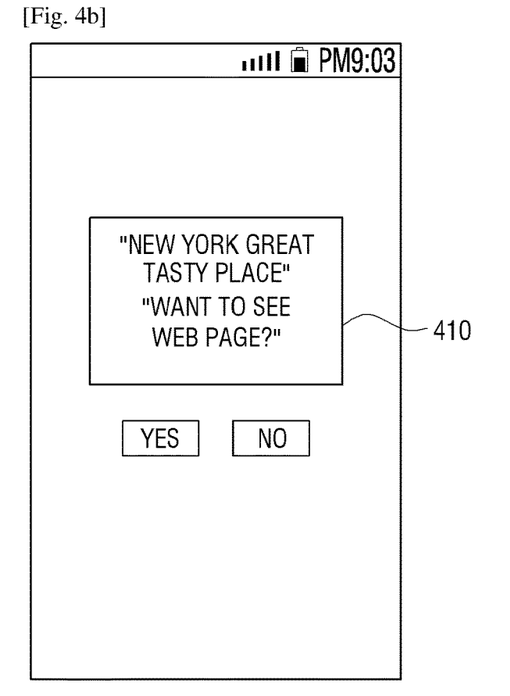

In this regard, the content providing module 360 may control the display 120 to provide a message 410 inquiring whether a content is to be provided as illustrated in FIG. 4b, before a web page "New York great tasty place XXX Grilled Duck" is to be provided. In this regard, the message 410 may include information relating to a content corresponding to the detected context and an icon for confirming the content provision. When a user command to provide content is input through a message, the content providing module 360 may control the display 120 to provide a web page content corresponding to the detected context as illustrated in FIG. 4a.

Figure 5A:
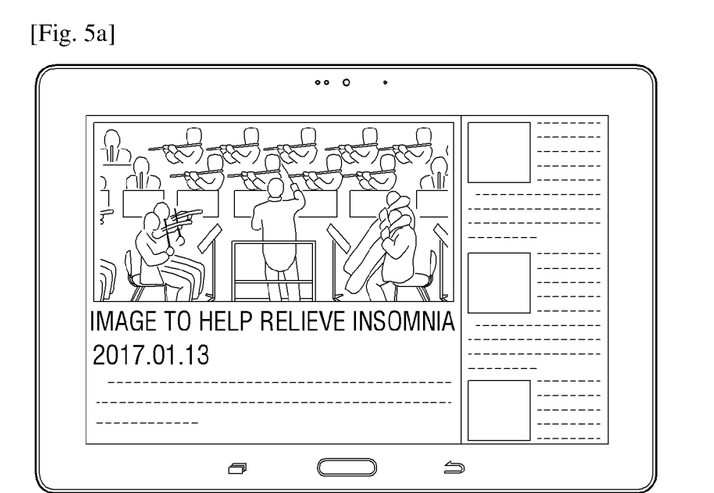

As another example, the content acquisition module 310 may acquire a video content "image to help relieve insomnia" and provide the video content through the display 120 as illustrated in FIG. 5a.

While the video content "image to help relieve insomnia" is provided, when a user command for clipping the content is detected, the keyword acquisition module 320 may acquire a keyword regarding the acquired video content. For example, the keyword acquisition module 320 may acquire keywords such as "insomnia" "sleep inducer" "video" and the like from the video content "image to help relieve insomnia" through a pre-trained data determination model or image analysis.

The context information acquisition module 330 may acquire, for example "wakefulness" as context information corresponding to keywords such as "insomnia", "sleep inducer", "video" and the like, using a pre-trained data determination model or a pre-stored keyword-context information matching table.

In addition, the database 340 may store information relating to a content (e.g., address information) and context information matched with the information relating to the content as shown below.

TABLE 2

| Information relating to content | Context information |
|---|---|
| http//:www.dongyoungsang.com/dontsleep | "wakefulness" |

After the information relating to the content and the context information are matched and stored in the database 340, the context detection module 350 may detect a context corresponding to the stored context information.

In this regard, in a case in which it is identified that the user continuously uses the electronic apparatus 100 after a predetermined time (e.g., 2 AM), the context detection module 350 may detect "wakefulness" as a current context.

In addition, in a case in which it is identified thorough the motion sensor 100 that the user continuously moved after a predetermined time, the context detection module 350 may detect "wakefulness" as a current context.

The context providing module 360 may control the display 120 to provide a context corresponding to the detected context. For example, in a case in which a context such as "wakefulness" is detected by the context detection module 350, the content providing module 360 may control the display 120 to provide a video content "image to help relieve insomnia" corresponding to the detected context.

Figure 5B:
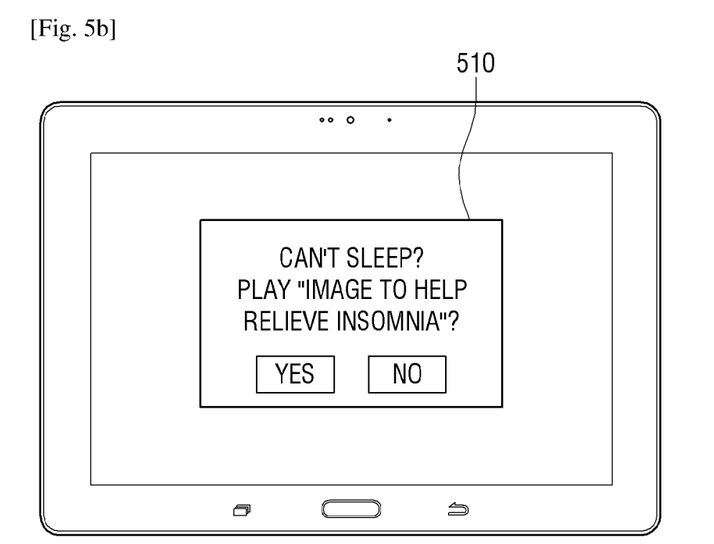

In this regard, the content providing module 360 may control the display 120 to provide a message 510 inquiring whether a content is to be provided as illustrated in FIG. 5*b*, before a video content "image to help relieve insomnia" is provided. In this regard, the message 510 may include information (e.g., "can't sleep?") relating to the detected context, information relating to a content (e.g., "image to help relieve insomnia") corresponding to the detected context, and an icon (e.g., icon for Yes and icon for No) for confirming the content provision. When a user command to provide a content is input through the message, the content providing module 360 may control the display 120 to provide a video content corresponding to the detected context as illustrated in FIG. 5*a*.

Figure 6A:
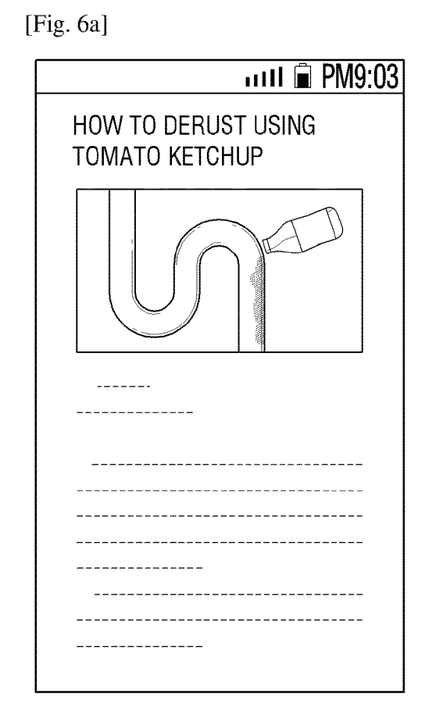

As another example embodiment, the content acquisition module 310 may acquire a web page content "how to derust using tomato ketchup" and provide the web page content through the display 120 as illustrated in FIG. 6*a*.

While the web page content "how to derust using tomato ketchup" is provided, when a user command to clip the content is detected, the keyword acquisition module 320 may acquire a keyword regarding the acquired video content. For example, the keyword acquisition module 320 may acquire a keyword such as "tomato ketchup", "derust" and the like from the web page content "how to derust using tomato ketchup" through a pre-trained data determination model or image analysis.

The context information acquisition module 330 may acquire "tomato ketchup purchase", "market visit", "derust", "access shopping website" and the like, as context information corresponding to keywords such as "tomato ketchup", "derust" and the like, using a pre-trained data determination model or a pre-stored keyword-context information matching table.

In addition, the database 340 may store information relating to a content (e.g., address information) and context information matched with the information relating to the content as shown below.

TABLE 3

| Information relating to content | Context information |
|---|---|
| http//:www.tiptip.kr/tomato-nok | "Tomato ketchup purchase", "market visit" and "derust" |

After the information relating to the content and the context information are matched and stored in the database 340, the context detection module 350 may detect a context corresponding to the stored context information.

In this regard, the context detection module 350 may detect a context from a sensing data acquired from the sensing unit 170. For example, when it is determined from the sensing data detected from the GPS sensor that the location information of the electronic apparatus 100 is "Market", the context detection module 350 may detect that a current context is "Market visit?.

In addition, the context detection module 350 may detect a context from the data acquired from an external apparatus. For example, when it is determined that the location information of the electronic apparatus 100 is "market" by using the data acquired from an AP installed at a market, the context detection module 350 may detect that a current context is "Market visit?.

In addition, the context detection module 350 may detect a context from schedule information input by a user. For example, when schedule information of "Visit market on Jan. XX, 2017" is input, the context detection module 350 may detect a context "Market visit?.

As another example, in a case in which a user access a grocery shopping website, the context detection module 350 may detect a context "access shopping website?.

As another example, the memory 160 may store information relating to a previously-detected context. For example, the memory 160 may store route information for "market visit". In addition, the context detection module 350 may identify a current context based on information relating to the previously-detected context. For example, in a case in which a current moving route of an electronic apparatus 100 coincides with a route to visit a market, based on the pre-stored route information, the context detection module 350 may detect "market visit" as a current context.

The context providing module 360 may control the display 120 to provide a context corresponding to the detected context. For example, in a case in which a context such as "market visit", "access shopping website" and the like is detected by the context detection module 350, the context providing module 360 may control the display 120 to provide a web page content "how to derust using tomato ketchup" corresponding to the detected context.

Figure 6B:
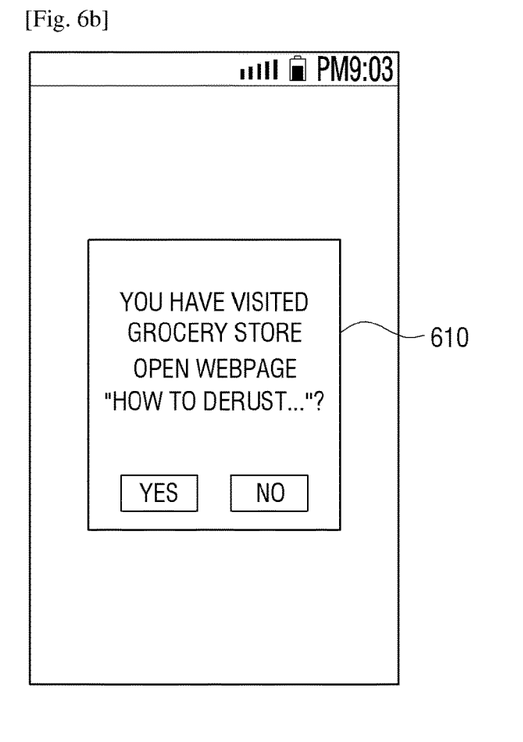

In this regard, the content providing module 360 may control the display 120 to provide a message 610 inquiring whether a content is to be provided as illustrated in FIG. 6*b*, before a web page "how to derust using tomato ketchup" is provided. In this regard, the message 610 may include information relating to the detected context (e.g., You have visited a grocery store), information relating to a content (e.g., how to derust using . . . ) corresponding to the detected context, and an icon (e.g., icon for Yes and icon for No) for confirming the content provision. When a user command to provide a content is input through a message, the content providing module 360 may control the display 120 to provide a video content corresponding to the detected context as illustrated in FIG. 6*a*.

Figure 7:
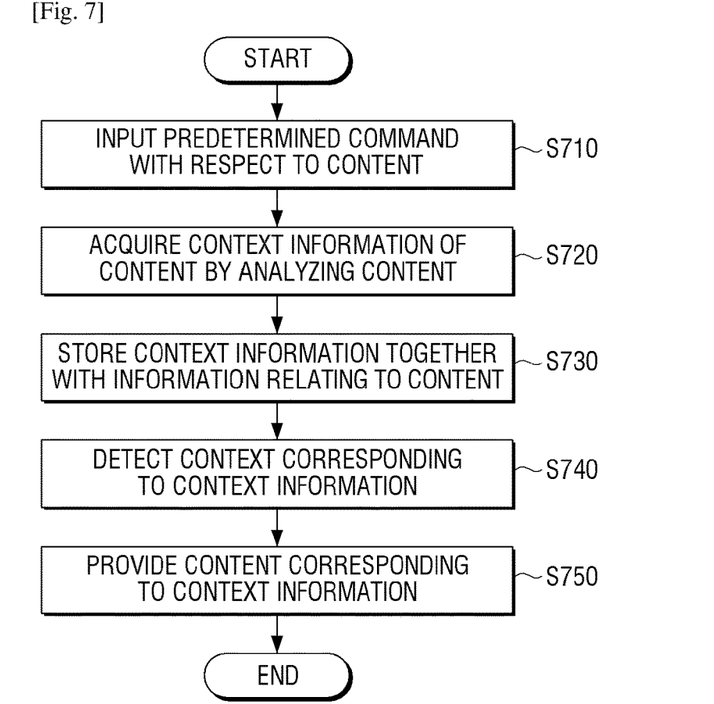
FIG. 7 is a flowchart illustrating a method for controlling an electronic apparatus, according to an example embodiment.

FIG. 7 is a flowchart illustrating a method for controlling an electronic apparatus, according to an example embodiment.

First, the electronic apparatus 100 receives a predetermined command regarding a content, at operation S710. In this regard, the predetermined command may be one from among a clipping command, a storage command, and a share command, but is not limited thereto.

In addition, the electronic apparatus 100 analyzes the content and acquires context information of the content, at operation S720. In this regard, the electronic apparatus 100 may acquire a keyword of the content by using a trained data determination model and acquire context information corresponding to the keyword.

In addition, the electronic apparatus 100 stores context information along with information relating to the content, at operation S730.

In addition, the electronic apparatus 10 detects a context corresponding to the context information, at operation S740. In this regard, the electronic apparatus 100 may detect a context based on a sensing data acquired from the sensing unit 170, a data received from an external apparatus, a schedule data, and the like.

In addition, the electronic apparatus 100 provides a content corresponding to the context, at operation S750. In this regard, the electronic apparatus 100 may not provide the content instantly, but may provide the content after first displaying a message inquiring whether the content is to be provided.

According to the various example embodiments described above, the electronic apparatus 100 provides a pre-stored content corresponding to the detected context, so that the user may identify the content clipped or stored by him or her as necessary without additional operation.

FIG. 8 is a diagram illustrating an electronic apparatus 100 and a system including a server 200 for generating context information, according to another example embodiment. Referring to FIG. 8, an intelligent assistant system 1000 may include the electronic apparatus 100 and the server 200.

In a case in which a predetermined user command relating to a content is received, the electronic apparatus 100 may transmit the predetermined user command to an external server 200. The server 200 may acquire context information of the content based on a trained data determination model in response to the received user command.

In addition, the server may transmit the acquired context information to an external electronic apparatus 100, and the electronic apparatus 100 may store information relating to the content together with context information received from the server 200.

As described above, the electronic apparatus 100 and the server 200 may interwork with each other so that information relating to the content and the context information are matched with each other and stored.

In other words, it may be implemented such that the electronic apparatus 100 serves to detect a context and provide a content, and that the server 200 acquires context information of the content. As illustrated in FIG. 8, when the electronic apparatus 100 is implemented as a small wearable device such as a smart watch and the available resources are limited, the processes of acquiring context information of the content may be performed by the server 200 which has rich resources.

Figure 9:
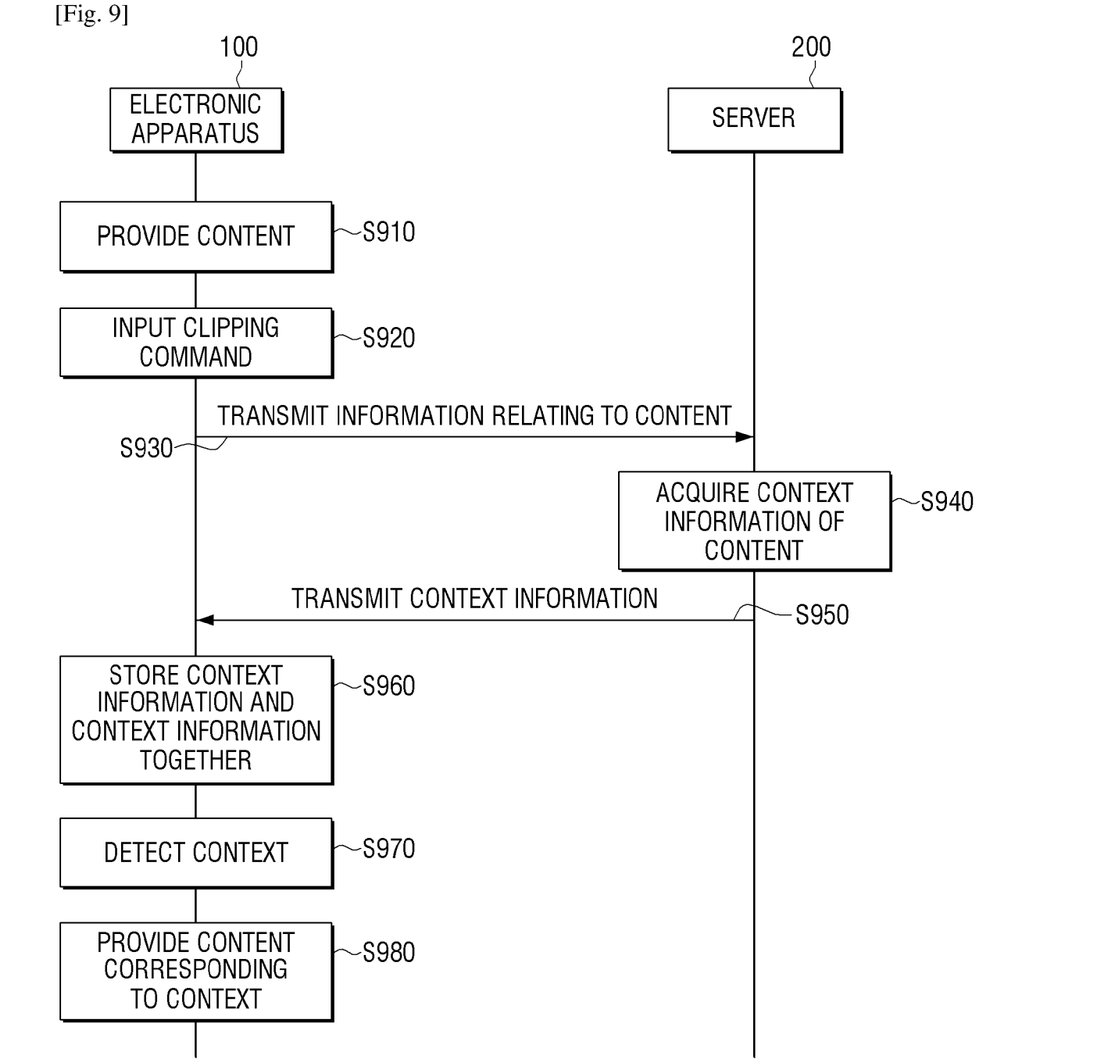
FIG. 9 is a sequence diagram illustrating a method of controlling a system providing a context recognition service, according to an example embodiment.

FIG. 9 is a sequence diagram illustrating a method for controlling a system to detect a context and provide a content, according to an example embodiment.

First, the electronic apparatus 100 provides a content, at operation S910. In this regard, the content may be a web page content or a video content, but is not limited thereto.

The electronic apparatus 100 receives a clipping command regarding the content, at operation S920. In this regard, the electronic apparatus 100 may receive a storage command, a share command, and the like, other than the clipping command.

The electronic apparatus 100 transmits information relating to the content to an external server 200, at operation S930. In this regard, the information relating to the content may be address information of the content, but is not limited thereto.

The server 200 acquires context information of the content based on the information relating to the content, at operation S940. In this regard, the server 200 may acquire a keyword of the content based on the information relating to the content and acquire information context information corresponding to the acquired keyword. In particular, the server 200 may perform a keyword acquisition and a context information acquisition based on a pre-trained data determination model.

The server 200 is configured to transmit the acquired context information to the electronic apparatus 100, at operation S950.

The electronic apparatus 100 is configured to store the content information together with the context information, at operation S960. In this regard, the electronic apparatus 100 may match the address information of the content and the context information and store the same.

The electronic apparatus 100 is configured to detect a context, at operation S970. In this regard, the electronic apparatus 100 may detect a context based on a sensing data acquired through the sensing unit 170, a data received from an external apparatus, a data including schedule information, and the like.

The electronic apparatus 100 is configured to provide a content corresponding to the context, at operation S980. In this regard, the electronic apparatus 100 may, after first providing a message informing a content corresponding to the context, when a user command is received through the message, provide a content corresponding to the context.

Although it is described above that the content information and the context information are stored in the electronic apparatus 100, it is possible that an external server 200 matches the content information and the context information and stores the same. In this regard, the electronic apparatus 100 may transmit the detected context to the external server 200. In addition, the server 200 may determine whether content information corresponding to the detected context is present, and transmit content information corresponding to the context to the electronic apparatus 100 based on the determination result.

Figure 10:
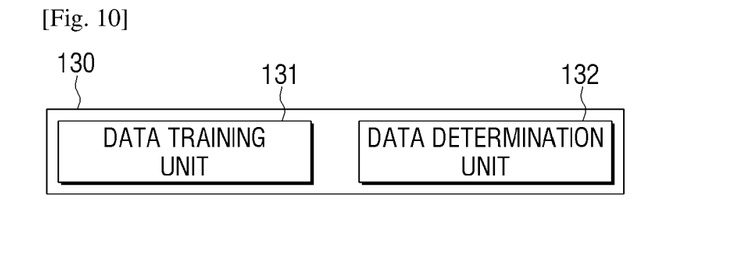
FIG. 10 is a block diagram illustrating a configuration of a processor, according to an example embodiment.

FIG. 10 is a block diagram illustrating the processor 130, according to an example embodiment. Referring to FIG. 10, the processor 130 according to an example embodiment may include a data training unit 131 and a data determination unit 132.

The data training unit 131 may be trained such that a data determination model has a standard for acquiring a keyword, a context, or the like. To identify a keyword, a context, or the like, the data acquisition unit 131 may generate a data determination model having an identification standard by applying a training data to a data determination model.

The processor 130 may analyze the input content according to a trained standard and acquire a keyword or context corresponding to the content. The data training unit 131 may determine which data is to be used to determine a keyword or a context. In addition, the data training unit 131 may acquire data to be used for training, and apply the acquired data to a data determination model (e.g., keyword acquisition model, context acquisition model and the like) to be described later, so as to train a criterion for the keyword acquisition or the context acquisition.

The data determination unit 132 may determine keyword information or context information corresponding to the content from a predetermined data by using a pre-trained data determination model. The data determination unit 132 may acquire a predetermined data (e.g., text data included in the content) according to a predetermined criterion by training, and use a data determination model with the acquired data as an input value. In addition, the data determination unit 132 may apply the input data to a data determination model and acquire a keyword or a context. In addition, the data determination unit 132 may refine a data determination model based on user feedback relating to an input value and an output value. At least one of the data training unit 131 and the data determination unit 132 may be manufactured in a form of one or a plurality of hardware chips and mounted in the electronic apparatus 100. For example, at least one of the data training unit 131 and the data determination unit 132 may be manufactured in the form of an exclusive hardware chip for artificial intelligence (AI) or may be mounted on a variety of electronic devices manufactured as a part of a conventional general purpose processor (e.g., a CPU or an application processor) or a graphics exclusive processor (e.g., a GPU). In this regard, the exclusive hardware chip for artificial intelligence may be an exclusive processor which is specialized in probability operation, and may show a higher performance compared with the previous general processor so as to facilitate processing of a computing operation in the field of artificial intelligence such as machine learning. Although the example embodiment of FIG. 10 illustrates a case in which both the data training unit 131 and the data determination unit 132 are mounted in the electronic apparatus 100, they may be mounted in different apparatuses separately. For example, one of the data training unit 131 and the data determination unit 132 may be included in the electronic device 100, and the other may be included in a server 200. The data training unit 131 and the data determination unit 132 may be coupled to each other via cable or wirelessly so that information relating to a data determination model constructed by the data training unit 131 may be provided to the data determination unit 132, and the data input to the data determination unit 132 may be provided to the data training unit 131 as additional training data.

At least one of the data training unit 131 and the data determination unit 132 may be implemented as a software module. When at least one of the data training unit 131 and the data determination unit 132 is implemented as a software module (or a program module including an instruction), the software module may be stored in non-transitory computer readable media. At least one software module may be provided by an operating system (OS) or a predetermined application. Alternatively, part of at least one software module may be provided by an OS, and the remaining part may be provided by a predetermined application.

Figure 11A:
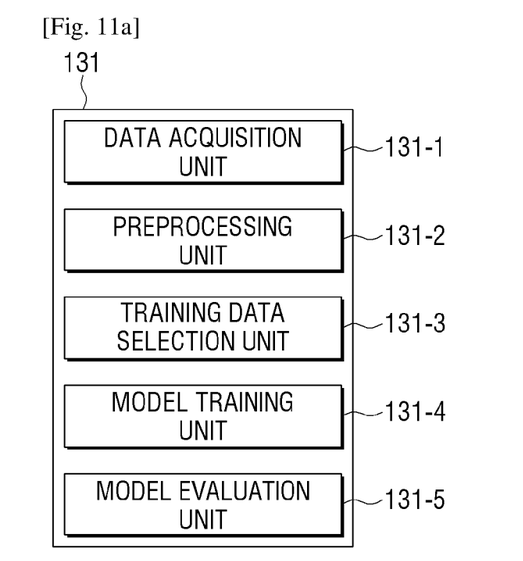
FIG. 11a is a block diagram illustrating a configuration of a data acquisition unit, according to an example embodiment.

FIG. 11a is a block diagram illustrating a data training unit 131, according to an example embodiment. Referring to FIG. 11a, the data training unit 131 according to an example embodiment may further selectively include at least one of a data acquisition unit 131-1, a preprocessing unit 131-2, a training data selection unit 131-3, a model training unit 131-4, and a model evaluation unit 131-5. The data acquisition unit 131-1 may acquire training data necessary for acquiring a keyword or a context. In particular, the data acquisition unit 131-1 may acquire data for acquiring a keyword or context of a content as training data.

For example, the data acquisition unit 131-1 may receive a content including a text data or an image data from an external server, an external apparatus, or a storage medium.

The preprocessing unit 131-2 may pre-process an acquired data so that the acquire data may be used for training to acquire a keyword or a context. The preprocessing unit 131-2 may pre-process obtained data so that the obtained data can be used for training for acquiring a keyword or a context.

For example, in a case in which the training data is a text data, the preprocessing unit 131-2 may perform pre-processing such as a sentence division, part of speech tagging, tokenization, elimination of stop words, and stemming with respect to the text data. As another example, in a case in which the training data is an image data, the pre-processing unit 131-2 may perform a decoding, scaling, a noise filtering, a resolution conversion, and the like, with respect to the image data and make an image format of the same format.

In addition, the preprocessing unit 131-2 may crop only a particular area included in each of a plurality of input image frames.

The training data selection unit 131-3 may select data required for training from the preprocessed data. The selected data may be provided to the model training unit 131-4. The training data selection unit 131-3 may select data necessary for training from the preprocessed data according to a predetermined criterion for the keyword acquisition and the context acquisition. In addition, the training data selection unit 131-3 may select data according to predetermined criteria by training of the model training unit 131-4 which will be described later. For example, the training data selection unit 131-1 may select only a noun component from the input text data.

The model training unit 131-4 may train a criterion regarding how a data determination model acquires a keyword or a context by using the training data.

For example, the model training unit 131-4 may train a data determination model through supervised learning using at least a portion of the training data as a criterion for identification. In addition, the model training unit 131-4 may train itself using a training data without under supervision and train a data determination model through unsupervised learning which discovers a criterion for determination for determining a situation.

In addition, the model acquisition unit 131-4 may train a criterion relating to which training data is to be used to acquire a keyword or a context. For the training data, data which is collected or tested by the data training unit 131 or the manufacturer of the electronic apparatus 100 may be used. The model training unit 131-4 may train the data determination model used to acquire a keyword or a context by using the training data. In this regard, the data determination model may be a model which is constructed in advance. For example, the data determination model may be a model which is constructed in advance by receiving a basic training data. As another example, the data determination model may be a model which is constructed in advance by using big data. The data determination model may be constructed considering the application field of the determination model, the purpose of training, or the computer performance of the device. The data determination model may be, for example, a model based on a neural network.

The data determination model may be designed to simulate a structure of human brain on the computer. The data determination model may include a plurality of network nodes having a weighted value which simulate neurons of a human neural network. Each of the plurality of network nodes may form a connection relationship so that neurons simulate a synaptic activity exchanging signals through synapse. The data determination model may, for example, include a neuron network model or a deep learning model which is advanced from the neuron network model. A plurality of network nodes in the deep learning model may be positioned at different depths (or layers) from each other, and may exchange data according to a convolution connection relationship. For example, a model such as Deep Neural Network (DNN), Recurrent Neural Network (RNN), and Bidirectional Recurrent Deep Neural Network (BDNR) may be used as a data determination model, but the present disclosure is not limited thereto.

According to one or more example embodiments, if there are a plurality of pre-established data determination models, the model training unit 131-4 may identify a data determination model with high relevancy between input training data and basic training data as a data determination model to learn. In this case, the basic training data may be pre-classified according to the type of data, and the data determination model may be pre-established according to the type of data. For example, the basic training data may be pre-classified by various criteria such as an area where the training data is generated, a time at which the training data is generated, a size of the training data, a genre of the training data, a creator of the training data, a kind of objects in training data, etc.

Also, the model training unit 131-4 may teach a data determination model using, for example, a training algorithm including an error back-propagation method or a gradient descent method.

For example, the model training unit 131-4 may train a data determination model through supervised learning using a criterion for determination as an input value for training. In addition, the model training unit 131-4 may, for example, train itself using training data required to acquire a keyword or a context without under supervision, and train the data determination model through an unsupervised learning which discovers a criterion for the keyword acquisition and the context acquisition. As another example, the model training unit 131-4 may train the data determination model through a reinforcement learning which uses feedback relating to whether a substitute keyword acquisition or context acquisition according to training is correct.

Further, when the data determination model is trained, the model training unit 131-4 may store the trained data determination model. In this case, the model training unit 131-4 may store the trained data determination model in the memory 110 of the electronic apparatus 100.

In this case, the memory 160 where the trained data determination model is stored may store commands or data associated with at least one other element of the electronic apparatus 100 together. In addition, the memory 160 may store software and/or programs. For example, the programs may include a kernel, a middleware, an application programming interface (API) and/or an application program (or "application"), etc.

Alternatively, the model training unit 131-4 may store the trained data determination model in a memory of a server coupled to the electronic apparatus 100 via a wired or wireless network.

The data training unit 131 may further include a preprocessing unit 131-2 and a training data selection unit 131-3 to improve a determination result of the data determination model or to save resources or time required for generating the data determination model.

The preprocessing unit 131-2 may preprocess data acquired from the data acquisition unit 131-1 to use the data to train context identification.

For example, the preprocessing unit 131-2 may preprocess the acquire data in a predefined format so that it is easy for the model training unit 131-4 to easily use the data for training of the data determination model. The preprocessed data may be provided to the model training unit 131-4 as training data.

Alternatively, the training data selection unit 131-3 may selectively select training data required for training from among the preprocessed data. The selected training data may be provided to the model training unit 131-4. The training data selection unit 131-3 may select a training data required for training from among the preprocessed data according to a predetermined standard of selection. In addition, the training data selection unit 131-3 may select a training data required for training according to a predetermined selection criterion by training of the model training unit 131-4.

The data training unit 131 may further include a model evaluation unit 131-5 to improve a determination result of the data determination model. The model evaluation unit 131-5 inputs evaluation data to the data determination model, and when a determination result output from the evaluation data does not satisfy a predetermined criterion, the model evaluation unit 131-5 may instruct the model training unit 131-4 to train again. In this case, the evaluation data may be predetermined data for evaluating the data determination model.

For example, if the number or the ratio of the evaluation data whose determination result is not accurate among the determination results of the trained data determination model for the evaluation data exceeds a predetermined threshold value, the model evaluation unit 131-5 may evaluate that predetermined criteria are not satisfied. For example, when the predetermined criteria are defined as a ratio of 2%, when the trained data determination model outputs an incorrect determination result for evaluation data exceeding 20 out of a total of 1000 evaluation data, the model evaluation unit 131-5 may evaluate that the trained data determination model is not suitable.

On the other hand, when there are a plurality of trained data determination models, the model evaluation unit 131-5 may evaluate whether each of the trained data determination models satisfies a predetermined criterion, and determine a model satisfying the predetermined criterion as a final data determination model. In this case, when there are a plurality of models satisfying a predetermined criterion, the model evaluation unit 131-5 may determine any one or a predetermined number of models previously set in descending order of an evaluation score as a final data determination model.

At least one of the data acquisition unit 131-1, the preprocessing unit 131-2, the training data selection unit 131-3, the model training unit 131-4, and the model evaluation unit 131-1 may be implemented as a hardware chip or may be manufactured in the form of a hardware chip and mounted on an electronic apparatus. For example, at least one of the data acquisition unit 131-1, the preprocessing unit 131-2, the training data selection unit 131-3, the model training unit 131-4, and the model evaluation unit 131-5 may be manufactured in the form of a hardware chip exclusively used for artificial intelligence (AI), in the form of the existing universal processor (for example, CPU or application processor), or as part of an Integrated Processor (IP) for a specific function to be mounted on the above-described various electronic apparatuses 100.

The data acquisition unit 131-1, the preprocessing unit 131-2, the training data selection unit 131-3, the model training unit 131-4, and the model evaluation unit 131-5 may be mounted on one electronic apparatus, or may be mounted on separate electronic apparatuses, respectively. For example, some of the data acquisition unit 131-1, the preprocessing unit 131-2, the training data selection unit 131-3, the model training unit 131-4, and the model evaluation unit 131-5 may be included in the electronic apparatus 100, and the rest may be included in the server 200.

At least one of the data acquisition unit 131-1, the preprocessing unit 131-2, the training data selection unit 131-3, the model training unit 131-4, and the model evaluation unit 131-5 may be implemented as a software module. If at least one of the data acquisition unit 131-1, the preprocessing unit 131-2, the training data selection unit 131-3, the model training unit 131-4, and the model evaluation unit 131-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 11B:
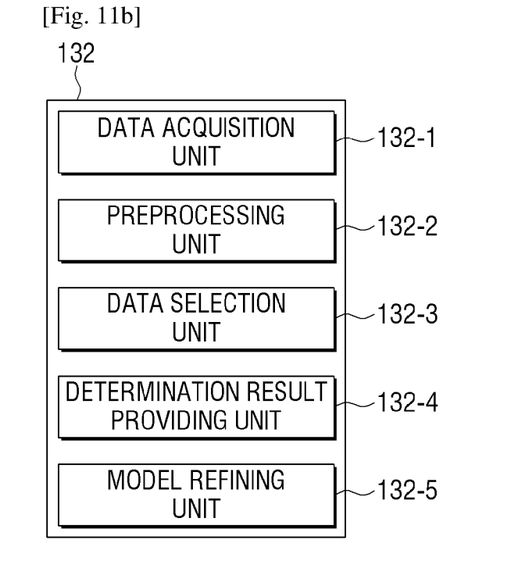
FIG. 11b is a block diagram illustrating a configuration of a data determination unit, according to an example embodiment.

FIG. 11b is a block diagram of the data determination unit 132, according to an example embodiment. Referring to FIG. 11b, the data determination unit 132 according to an example embodiment may include a data acquisition unit 132-1 and a determination result providing unit 132-4. In addition, the data determination unit 132 may further selectively include at least one of a preprocessing unit 132-2, a data selection unit 132-3, and a model refining unit 132-5.

The data acquisition unit 132-1 may acquire data required for keyword acquisition or context acquisition. The preprocessing unit 132-2 may preprocess the provided data so that the data provided for keyword acquisition and context acquisition may be used. The preprocessing unit 132-2 may process the acquired data into a predetermined format so that the determination result providing unit 132-4, which will be described later, can utilize the data acquired to acquire a keyword or a context.

The data selection unit 132-3 may select a data required for keyword acquisition or context acquisition from among the preprocessed data. The selected data may be provided to the determination result providing unit 132-4. The data selection unit 132-3 may select some or all of the preprocessed data according to a predetermined criterion for the keyword acquisition or the context acquisition. In addition, the data selection unit 132-3 may select data according to the criteria predetermined by training of the model training unit 142-4 which will be described later.

The determination result providing unit 132-4 may apply the data acquired from the data acquisition unit 132-1 to a data determination model trained by the input value and identify a keyword or context corresponding to the content. Alternatively, the determination result providing unit 132-4 may apply the data preprocessed by the pre-processing unit 132-2 to a data determination model trained by the input value and provide a determination result. Alternatively, the determination result providing unit 132-4 may apply a data selected by the data selection unit 132-3 to a data determination model as an input value and provide a determination result.

In addition, the determination result may be determined by the data determination model. For example, the determination result providing unit 132-4 may input a data included in the content in the data determination model and acquire a keyword or context corresponding to the content.

The model refining unit 132-5 may refine a data determination model based on an evaluation of a determination result provided by the determination result providing unit 132-4. For example, the model refining unit 132-5 may provide a determination result provided by the determination result providing unit 132-4 to the model training unit 131-4, to thereby enable the model training unit 131-4 to refine a data determination model.

At least one of the data acquisition unit 132-1, the preprocessing unit 132-2, the determination data selection unit 132-3, the determination result providing unit 132-4, and the model refining unit 132-5 in the data determination unit 132 may be fabricated in at least one hardware chip form and mounted on an electronic apparatus. For example, at least one of the data acquisition unit 132-1, the preprocessing unit 132-2, the data selection unit 132-3, the determination result providing unit 132-4, and the model refining unit 132-5 may be manufactured in the form of a chip exclusively used for hardware for artificial intelligence (AI), in the form of the existing universal processor (for example, CPU or application processor), or as part of an Integrated Processor (IP) for a specific function to be mounted on the above-described various electronic apparatuses 100.

The data acquisition unit 132-1, the preprocessing unit 132-2, the determination data selection unit 132-3, the determination result providing unit 132-4, and the model refining unit 132-5 may be mounted on an electronic apparatus, or may be mounted on separate electronic apparatuses, respectively. For example, some of the data acquisition unit 132-1, the preprocessing unit 132-2, the determination data selection unit 132-3, the determination result providing unit 132-4, and the model refining unit 132-5 may be included in the electronic apparatus 100 and the rest may be included in a server interworking with the electronic apparatus 100.

At least one of the data acquisition unit 132-1, the preprocessing unit 132-2, the data selection unit 132-3, the determination result providing unit 132-4, and the model refining unit 132-5 may be implemented as a software module. If at least one of the data acquisition unit 132-1, the preprocessing unit 132-2, the data selection unit 132-3, the determination result providing unit 132-4, and the model refining unit 132-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

The methods according to one or more exemplary embodiments may be implemented as a program instruction type that may be performed through various computer units and may be recorded in a computer readable medium. The computer-readable medium may include instructions, a data file, a data structure or the like, alone or a combination thereof. The one or more instructions recorded in the computer-readable medium may be designed for the exemplary embodiments or be known to those skilled in a field of computer software.

Here, the instructions may be stored in a computer-readable non-transitory recording medium and read and executed by a computer, thereby realizing the embodiments of the present disclosure.

Here, the non-transitory readable recording medium refers to a medium that semi-permanently stores data and is capable of being read by a device, and includes a register, a cache, a buffer, and the like, but does not include transmission media such as a signal, a current, etc.

Specifically, the above-described instructions may be stored in non-transitory readable recording media such as CD, DVD, hard disk, Blu-ray disc, USB, internal memory (e.g., memory 110), memory card, ROM, RAM, and the like.

The instructions may include not only machine codes which are made by a compiler, but also high-level language code which can be executed via computer by using interpreter. The hardware device may be configured to operate as one or more software modules. Conversely, software modules may be configured to operate as a hardware device.

In addition, the method according to the above-described example embodiments may be provided as a computer program product.

The computer program product may include an S/W program, a computer readable storage medium in which the S/W program is stored or a product traded between a seller and a consumer.

For example, the computer program product may include an electronic apparatus or a product (e.g., a downloadable app) in the form of an S/W program electronically distributed by a manufacturer of the electronic apparatus or an electronic market (e.g., Google play store™ and App store™). For electronic distribution, at least some of the S/W program may be stored in the storage medium or may be temporarily generated. In this case, the storage medium may be a server of a manufacturer, a server of an electronic market or a relay server which temporarily stores an S/W program.

The foregoing exemplary embodiments and advantages are merely exemplary and are not to be construed as limiting the present inventive concept. Accordingly, the scope of the present disclosure is not construed as being limited to the described exemplary embodiments, but is defined by the appended claims as well as equivalents thereto.

The invention claimed is:

1. A method for controlling an electronic apparatus, the method comprising:
   in response to receiving a predetermined command with respect to a content, acquiring a keyword of the content by using a first data determination model trained using artificial intelligence algorithm;
   acquiring at least one first context information of the content by inputting the acquired keyword to a second data determination model trained using artificial intelligence algorithm;
   storing the at least one first context information and information relating to the content;
   detecting second context based on schedule information of a user stored in the electronic apparatus and identifying the first context information corresponding to the detected second context; and
   based on the first context information corresponding to the second context information being identified, providing a stored content corresponding to the first context information in response to detecting the second context.

2. The method of claim 1,
   wherein the information relating to the content includes address information of the content, and
   wherein the storing comprises tagging the context information to the address information of the content and storing the tagged information.

3. The method of claim 1, wherein the providing comprises:
   detecting the second context corresponding to the first context information from a sensing value acquired from a sensor provided in the electronic apparatus.

4. The method of claim 1, wherein the providing comprises:
   acquiring information relating to a context from an external apparatus connected to the electronic apparatus; and
   in response to detecting the second context corresponding to the first context information based on the information, providing the stored content corresponding to the detected context.

5. The method of claim 1,
   wherein the electronic apparatus stores information relating to a previously-detected context in a memory, and
   wherein the providing comprises:
      identifying a current context based on the information relating to the previously-detected context, and
      in response to the identified current context corresponding to the first context information, providing the stored content corresponding to the detected context.

6. The method of claim 1, wherein the providing comprises:
   in response to detecting the second context corresponding to the first context information, providing a message for informing the detection of the second context; and
   in response to a user command being received through the message, providing the content corresponding to the detected context.

7. The method of claim 1,
   wherein the content comprises a web page content, and
   wherein the predetermined command comprises a clipping command with respect to the web page content.

8. An electronic apparatus, comprising:
   an input interface configured to receive a user command;
   a memory;
   a display configured to display a content; and
   a processor configured to:
      in response to receiving a predetermined command with respect to the content through the input interface, acquire a keyword of the content by using a first data determination model trained using an artificial intelligence algorithm,
      acquire at least one first context information of the content by inputting the acquired keyword to a second data determination model trained using an artificial intelligence algorithm,
      store the at least one first context information and information relating to the content in the memory,
      detect second context based on schedule information of a user stored in the electronic apparatus,
      identify the first context information corresponding to the detected second context, and
      based on the first context information corresponding to the second context being identified, control the display to provide a stored content corresponding to the first context information in response to detecting the second context.

9. The electronic apparatus of claim 8,
   wherein the information relating to the content includes address information of the content, and
   wherein the processor is further configured to:
      tag the context information to the address information of the content, and
      store the tagged information in the memory.

10. The electronic apparatus of claim 8, wherein the processor is further configured to detect the second context corresponding to the first context information from a sensing value acquired from a sensor provided in the electronic apparatus.

11. The electronic apparatus of claim 8, wherein the processor is further configured to:
   acquire information relating to a context from an external apparatus connected to the electronic apparatus, and
   in response to detecting the second context corresponding to the first context information based on the acquired information, control the display to provide the stored content corresponding to the detected context.

* * * * *